United States Patent [19]
Satran et al.

[11] Patent Number: 5,232,319
[45] Date of Patent: Aug. 3, 1993

[54] INSERT FOR A MILLING CUTTER

[75] Inventors: Amir Satran, Kfar Havradim; Carol Smilovici, Acre, both of Israel

[73] Assignee: Iscar Ltd., Tefen, Israel

[21] Appl. No.: 940,083

[22] Filed: Sep. 3, 1992

Related U.S. Application Data

[63] Continuation-in-part of Ser. No. 756,303, Sep. 6, 1991, Pat. No. 5,158,402.

[30] Foreign Application Priority Data

Oct. 25, 1990 [IL] Israel .................................. 96111

[51] Int. Cl.⁵ ............................................... B23C 5/10
[52] U.S. Cl. ................................. 407/114; 407/113; 407/48
[58] Field of Search .................. 407/47, 48, 113, 114, 407/115, 116

[56] References Cited

U.S. PATENT DOCUMENTS

| | | | |
|---|---|---|---|
| 4,278,369 | 7/1981 | Jakobs et al. | 407/114 |
| 4,946,318 | 8/1990 | David et al. | 407/61 |
| 5,052,863 | 10/1991 | Satran | 407/116 |
| 5,078,550 | 1/1992 | Satran et al. | 407/34 |
| 5,158,402 | 10/1992 | Satran et al. | 407/113 |

FOREIGN PATENT DOCUMENTS 196107  11/1984  Japan .................................. 407/114

Primary Examiner—William E. Terrell
Attorney, Agent, or Firm—Burgess, Ryan & Wayne

[57] ABSTRACT

A cutting insert for use with a rotary milling cutter tool has at least one major cutting edge comprising first, second and third successive component cutting edges. Each second component cutting edge is substantially coextensive with the bore and is of substantially greater length than the length of each of the first and second component cutting edges, and defines with respect to the axis of rotation of the cutter tool an axial rake angle which is substantially less positive than the axial rake angles defined respectively to the first and third component cutting edges with respect to the axis of rotation.

5 Claims, 12 Drawing Sheets

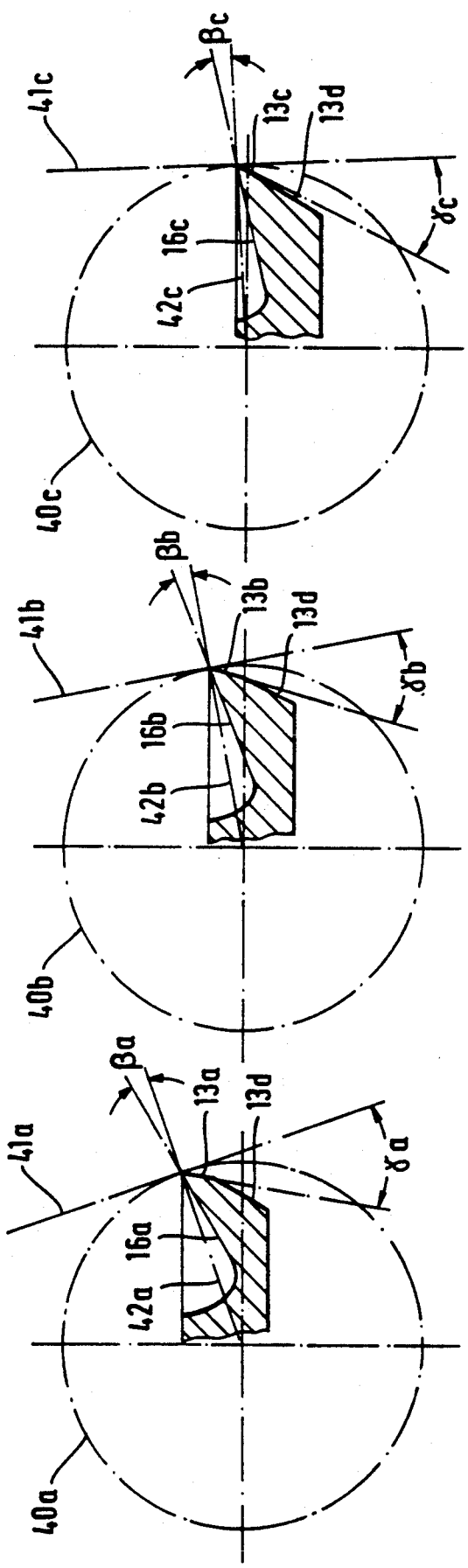

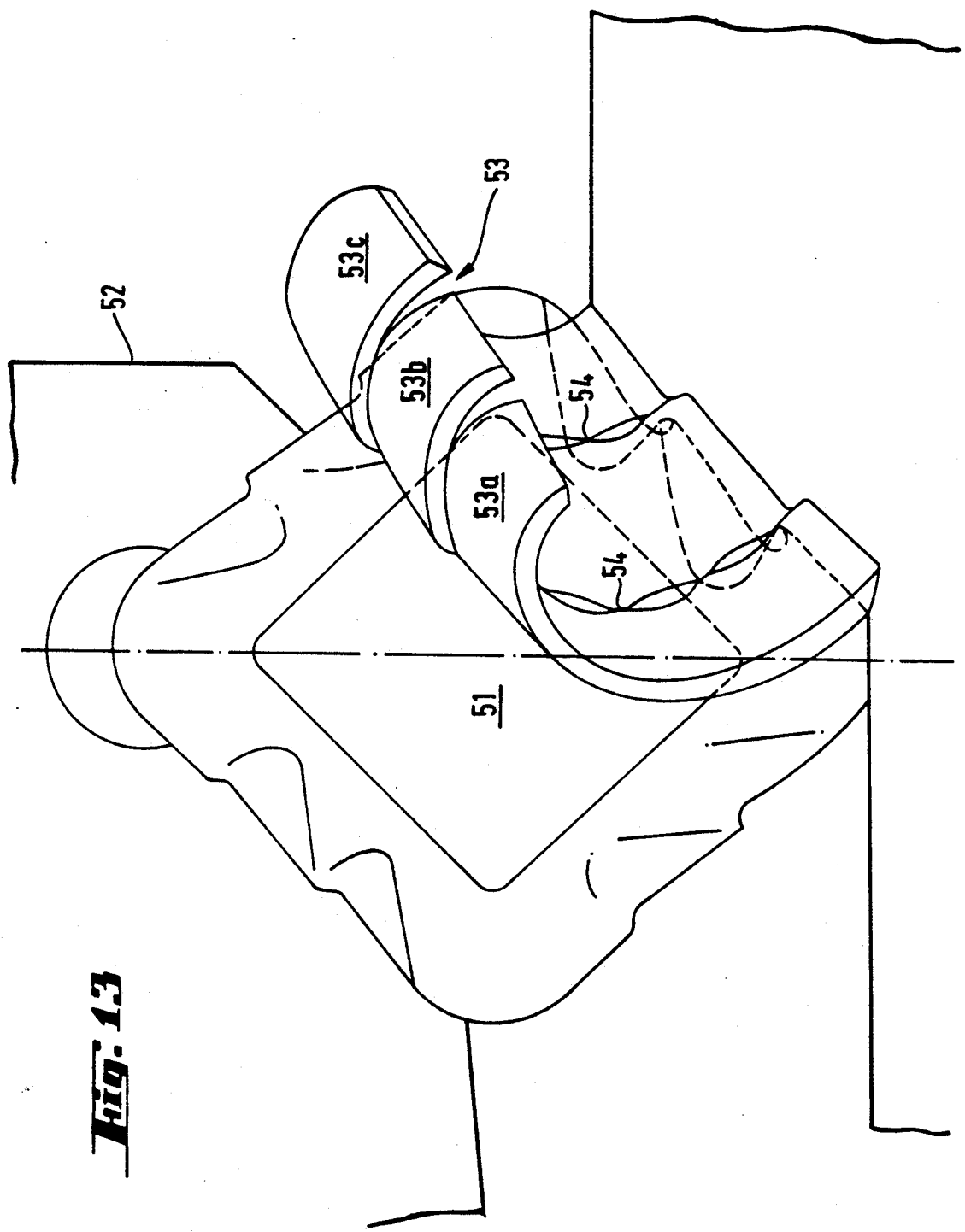

INSERT FOR A MILLING CUTTER

This application is a continuation-in-part of our co-pending application Ser. No. 756,303 filed Sep. 6, 1991 (hereinafter "the co-pending application") U.S. Pat. No. 5,158,402.

FIELD OF THE INVENTION

This invention relates to exchangeable hard metal cutting inserts for sue with a rotary milling cutter comprising a holder in which are formed one or more peripheral recesses in which are respectively and releasably mounted a corresponding number of such inserts, the or each recess furthermore providing for a swarf space in front of each insert.

BACKGROUND OF THE INVENTION

It is known that during milling cutting operations the length of the cutting edge is directly related to the vibrations induced in the milling cutter and the workpiece and the energy requirements in carrying out the cutting operation. The vibrations give rise to so-called "chatter". In other words, "chatter" tends to increase with increasing length of the cutting edge.

The vibrations and consequent "chatter" arise out of the forces exerted on the cutting insert and especially on the cutting rake surface thereof by the chip which is formed and the greater the width of the chip, the greater will be the exerted forces. With a view to decreasing these vibrations and "chatter", it is known to employ milling cutters having cutting inserts with relatively short cutting edges, the inserts being so oriented with respect to the tool holder and with respect to each other that the cutting pads of the cutting edges of successive cutting inserts overlap. In this way each relatively short cutting edge gives rise to a chip of relatively narrow width, the overlap between the cutting edges of successive cutting inserts ensuring that relatively smooth milling is attained.

In practice, however, this proposal is not found to be effective, requiring as it does the careful preliminary orientation of correctly designed cutting inserts on and with respect to the tool holder.

The co-pending application disclosed a new and improved cutting insert for use with a milling cutter, which insert is, by itself, capable of achieving the desired objective of reduced "chatter" in the use of the milling cutter tool.

According to the co-pending application, there is provided a cutting insert for use with a rotary milling cutter tool and having a cutting edge defined between a cutting rake surface and a relief flank and having a base edge defined between said relief flank and a base surface;

characterised in that said cutting edge comprises a plurality of successive component cutting edges and intermediate edges respectively located between successive component cutting edges; each component cutting edge having respective leading and trailing extremities, the trailing extremity of one component cutting edge merging with the leading extremity of a succeeding component cutting edge via an intermediate edge, said intermediate edge being directed from said trailing extremity of said one component cutting edge towards said base edge; each normal to an axis of rotation of said cutter tool which passes through a trailing extremity of one component cutting edge intersects the successive component cutting edge so that during a milling operation, successive component cutting edges overlap.

With such a cutting insert, and in view of the fact that the component cutting edges are very short, the resultant forces exerted on the cutting insert by the chips formed by these short cutting edges are relatively low and, in consequence, the degree of "chatter" encountered is minimal. Thus, in view of the relative disposition of the component cutting edges with the degree of overlapping of adjacent successive component cutting edges, it is ensured that effectively separate chips are formed of relatively low width.

BRIEF SUMMARY OF THE INVENTION

According to the present invention, these is provided, in a cutting insert of substantially parallelepipedal shape for use with a rotary milling cutter tool and having an upper rake surface and a base surface with a centrally disposed clamping bore and having a pair of substantially parallel major cutting edges and a pair of substantially parallel minor cutting edges directed transversely with respect to the major cutting edges, each major cutting edge being defined between an adjacent rake surface and a relief flank, each relief flank defining with said base surface a base edge;

the improvement wherein each major cutting edge comprises first, second and third successive component cutting edges, each second component cutting edge being substantially coextensive with said bore and being of substantially greater length that the length of each of said first and second component cutting edges and defining with respect to an axis of rotation of the cutter tool an axial rake angle which is substantially less positive than the axial rake angles defined respectively by said first and third component cutting edges with respect to said axis of rotation, and wherein each component cutting edge has respective leading and trailing extremities, the trailing extremity of one component cutting edge merging with the leading extremity of a succeeding component cutting edge via an intermediate edge, said intermediate edge being directed from said trailing extremity of said one component cutting edge towards said base edge; each normal to said axis of rotation of the cutter tool which passes through a trailing extremity of one component edge intersecting the successive component cutting edge so that, during a milling operation, successive component cutting edges overlap.

By virtue of the particular choice of the relative lengths and axial rake angles of the three successive component cutting edges of the insert in accordance with the invention, it is ensured that the mechanical strength of the insert in the region of its locating bore is reinforced.

Preferably, the cutting rake, relief flank and land surfaces associated with the respective component cutting edges are so directed that at corresponding locations along the respective component edges the insert rake and relief angle, as well as the land surface angles as defined with respect to the cutter tool, are substantially equal.

BRIEF SUMMARY OF THE DRAWINGS

Various embodiments of a hard metal cutting insert in accordance with the invention, for use with a rotary milling cutter, will now be described by way of example and with reference to the accompanying drawings, in which:

FIGS. 10a; 11a; and 12a are cross-sectional views taken respectively along the lines X—X; XI—XI; and XIIa—XIIb of the insert as mounted in the view shown in FIG. 4 superimposed on associated circular cutting paths;

FIGS. 10b; 11b; and 12b are highly enlarged views of the views shown in FIGS. 10a; 11a; and 12a designed to illustrate the K-land of the insert;

FIG. 13 illustrates the production of a multi-component chip in a milling operation using a cutting insert in accordance with the invention.

DETAILED DESCRIPTION OF PREFERRED EMBODIMENTS

Figure 1:
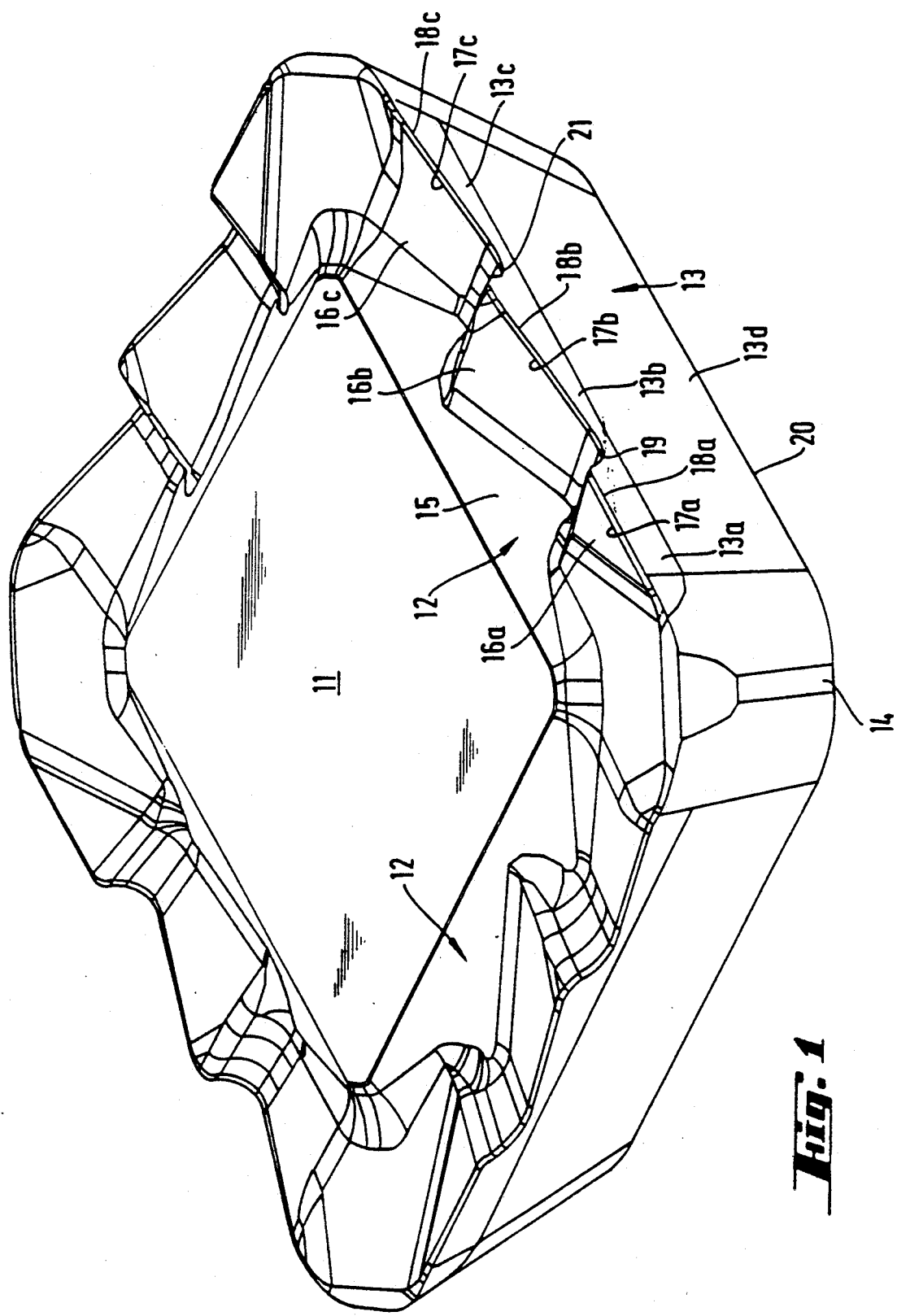
FIG. 1 is a perspective view of one embodiment of a cutting insert in accordance with the invention.
Figure 2:
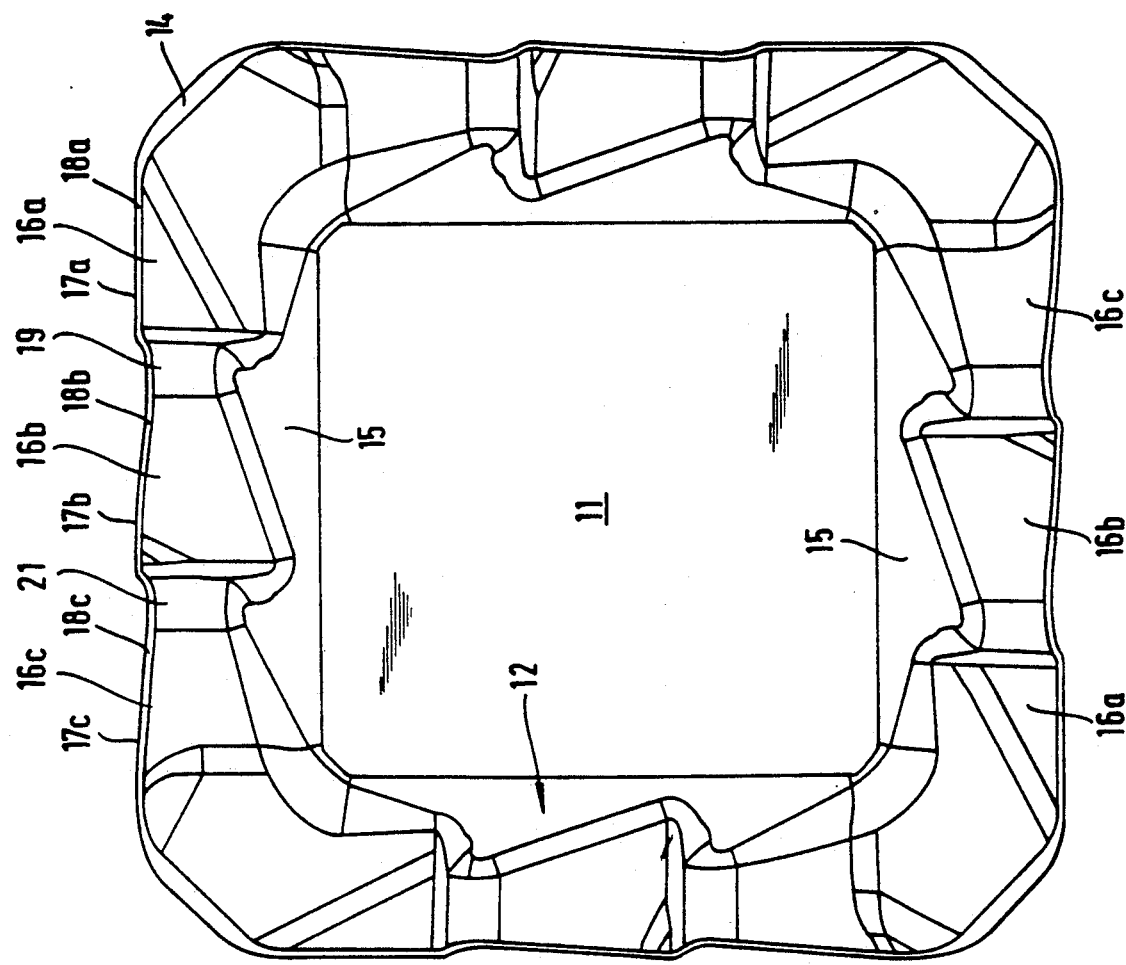
FIG. 2 is a plan view from above of the insert shown in FIG. 1.
Figure 3:
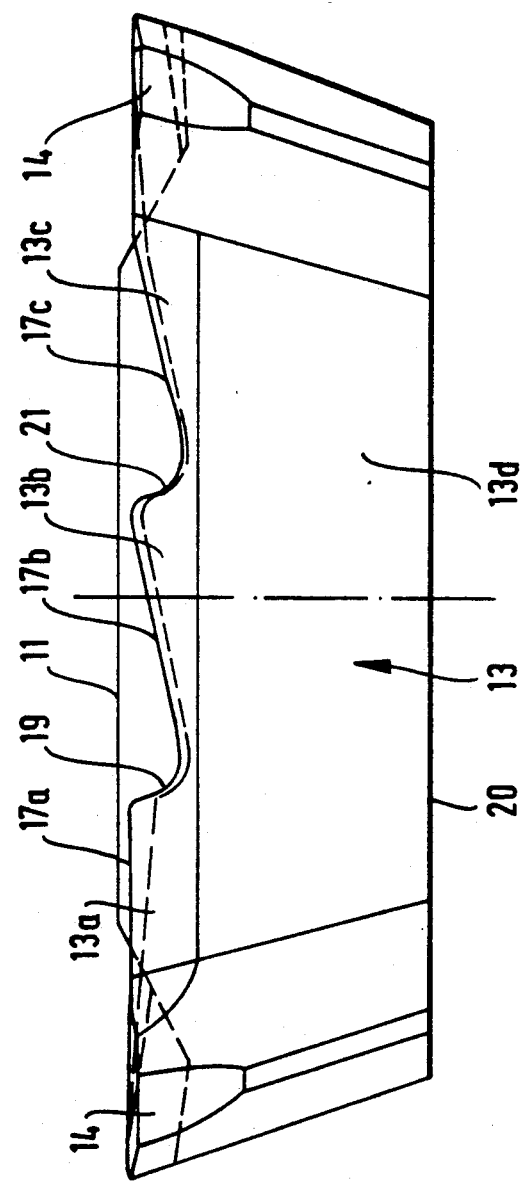
FIG. 3 is a side elevation of the insert shown in FIGS. 1 and 2.

As seen in FIGS. 1, 2 and 3 of the drawings, the cutting insert, which is formed of tungsten carbide, is of generally parallelepipedal shape having a central, upper planar surface 11 surrounded by a peripheral, upper cutting rake surface 12. The insert is formed with a planar base surface (not seen), which is parallel with the central, planar surface 11. The insert is further formed with two pairs of relief flanks 13 and, at the corners, with wipers 14 of conventional construction. Each relief flank 13 comprises three upper component relief flanks 13a, 13b and 13c, which are angularly directed with respect to each other in a manner to be described below, and a lower, planar relief flank portion 13d.

Each upper cutting rake region 12 comprises a longitudinally extending chip forming groove 15 and three component chip rake surfaces 16a, 16b and 16c.

Component cutting edges 17a, 17b and 17c are defined between the respective component relief flanks and component cutting rake surfaces via respective K-lands 18a, 18b and 18c.

The leading component cutting edge 17a merges at its terminal extremity with the succeeding component cutting edge 17b via an intermediate edge 19 which slopes downwardly towards a base edge 20 of the insert.

Similarly, the component cutting edge 17b merges with the succeeding cutting edge 17c via an intermediate edge 21, which also slopes downwardly towards the base edge 30 of the insert.

Figure 4:
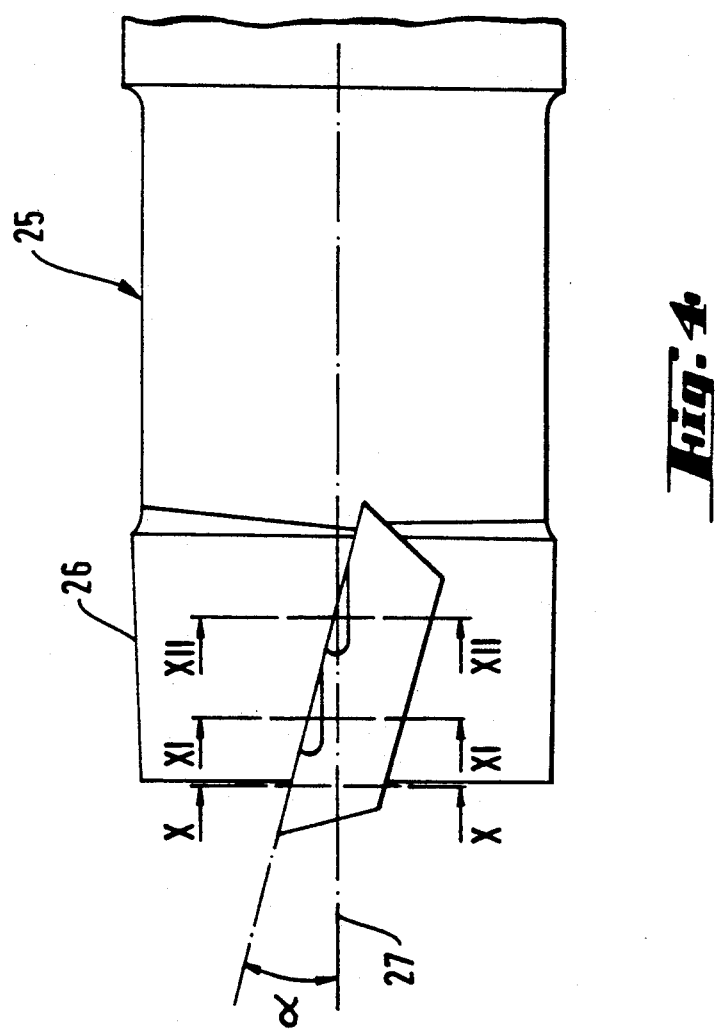
FIG. 4 is a schematic side elevation of the insert shown in FIGS. 1, 2 and 3 when mounted on a cylindrical milling cutter tool.

As seen in FIG. 4 of the drawings, the insert just described with reference to FIGS. 1, 2 and 3, is mounted in a rotary milling cutter 25 having a cylindrical holder 26, the insert being mounted so as to present a positive axial rake angle α with respect to an axis of rotation 27 of the cutter tool 25.

Figure 5:
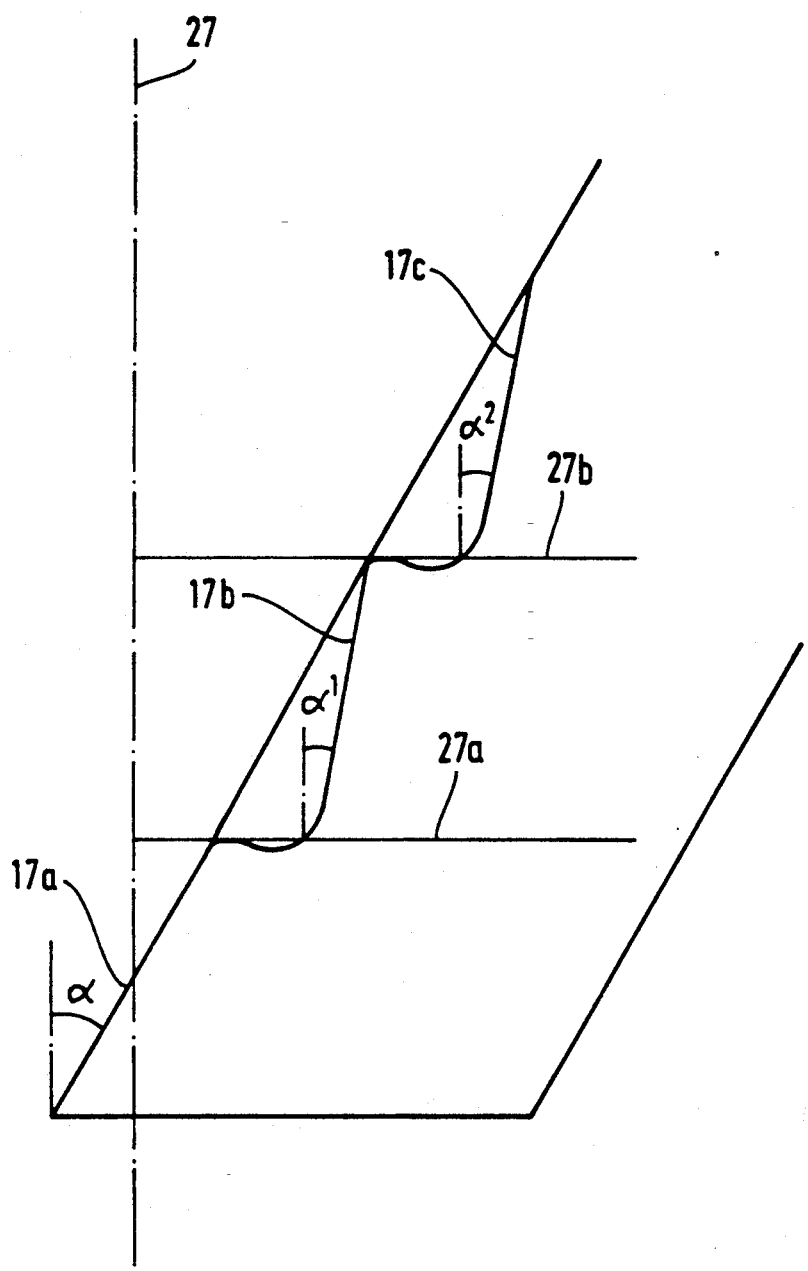
FIG. 5 is a schematic side elevation on an enlarged scale of the mounted insert shown in FIG. 4.

Reference will now be made to FIG. 5 of the drawings, which shows schematically the location of the cutting insert within the cutter tool during a milling operation. From this drawing, it can be seen that the component cutting edges 17a and 17b effectively overlap during a milling operation by virtue of the fact that a normal 27a with respect to the rotation axis 27, when passing through a trailing extremity of the component cutting edge 17a, intersects the succeeding component cutting edge 17b. Similarly, a normal 27b to the rotational axis 27, when passing through a trailing extremity of the component cutting edge 17b, intersects the succeeding component cutting edge 17c.

It will be readily seen from FIG. 5 of the drawings that, whereas the component cutting edge 17a has a positive axial rake angle equal to α (i.e., the positive rake angle of the insert of a whole as seen in FIG. 4 of the drawings), the component cutting edges 17b and 17c have substantially smaller axial rake angles $α_1$ and $α_2$ (in the example now being considered, these angles are not equal but they can also be equal). Now it is known with milling cutting tools of this kind that the cutting forces acting on the insert and tending to detach the insert from the holder, tend to increase with increasing positive axial rake angles. It therefore follows that any reduction in the magnitude of the positive axial rake angle will be accompanied by a consequent reduction in these forces.

Figure 6:
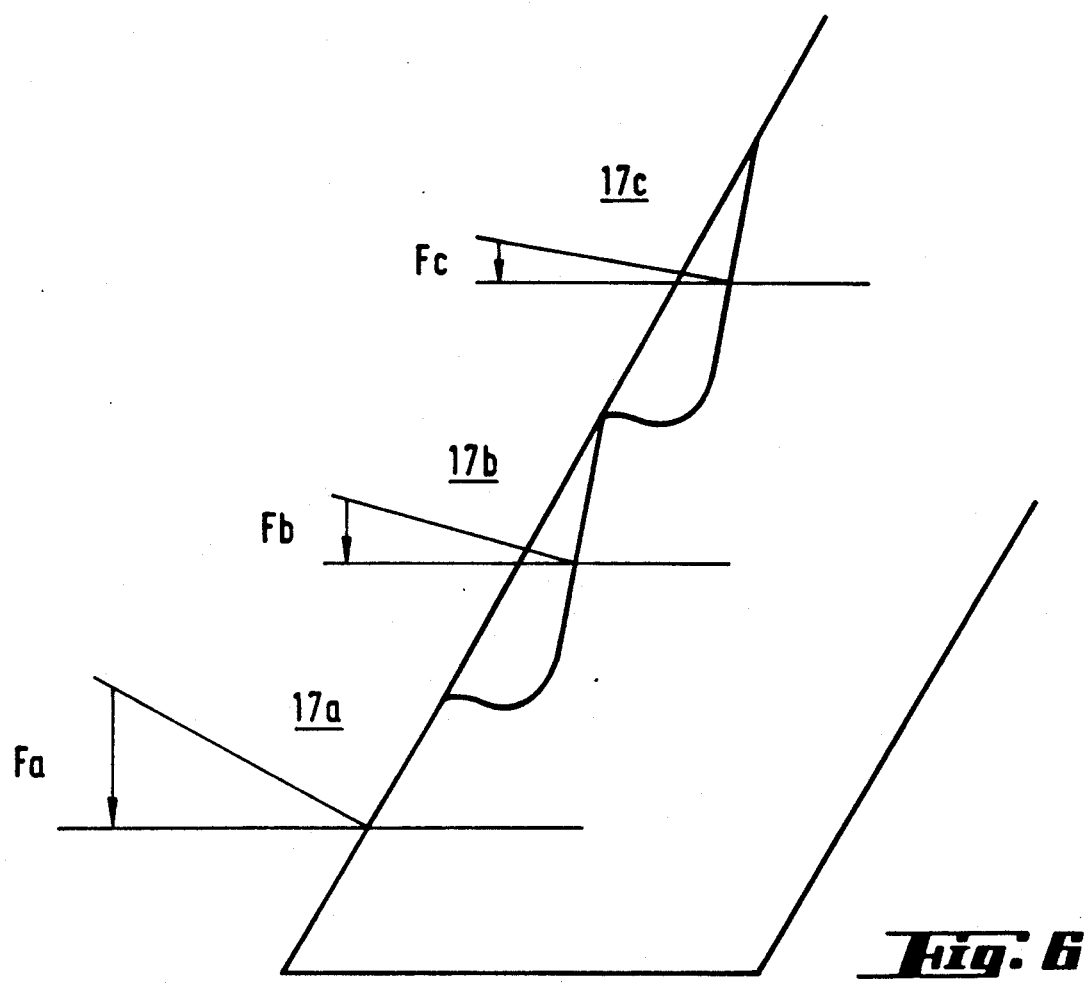
FIG. 6 is a view similar to that of FIG. 5 diagrammatically illustrating cutting forces exerted on the insert.
Figure 6A:
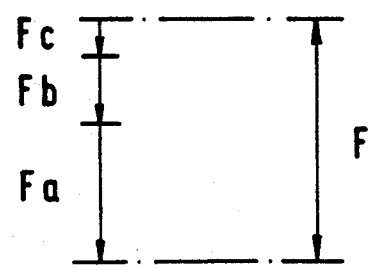
FIG. 6a illustrates diagrammatically the sum of the cutting forces shown in FIG. 6.

Referring now to FIG. 6 of the drawings, the component forces $F_a$, $F_b$ and $F_c$, acting respectively on the component cutting edges 17a, 17b and 17c in a direction tending to detach the insert from the holder, clearly tend to decrease with decreasing positive axial rake angle of the component cutting edges. FIG. 6a shows schematically the sum total F of the individual forces $F_a$, $F_b$ and $F_c$, and this sum total F is significantly less than would be the case if a unitary cutting edge was employed with a unitary axial rake angle equal to α.

Thus, in addition to the main purpose and advantage of the cutting insert just described in accordance with the invention, namely, effecting milling operations with component cutting edges of reduced length, thereby giving rise to significantly reduced "chatter", the provision of the cutting insert with component cutting edges of differing axial rake angles, gives rise to a reduction in the forces exerted on the insert and which tend to detach the insert from the holder.

Figure 8:
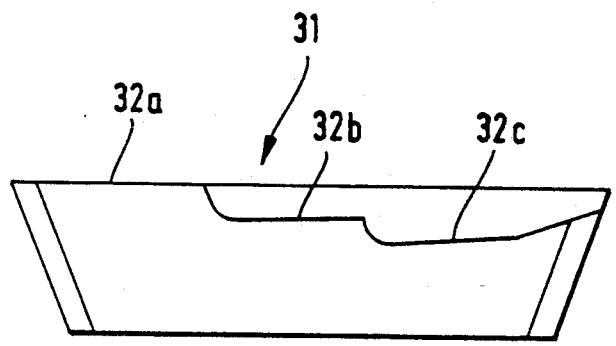
FIG. 8 is a side elevation of the insert shown in FIG. 7.
Figure 7:
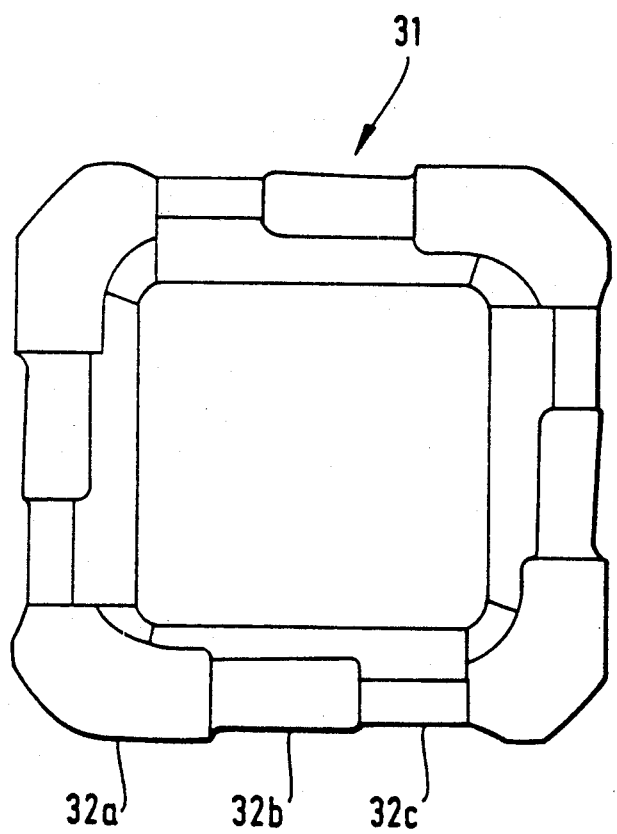
FIG. 7 is a plan view from above of an alternative embodiment of a cutting insert in accordance with the invention.
Figure 9:
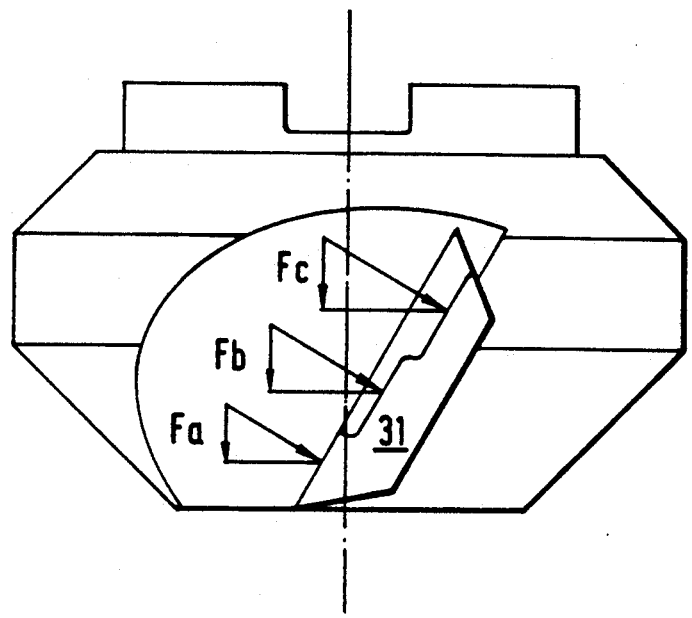
FIG. 9 is a schematic side elevation of the insert shown in FIGS. 7, and 8 when mounted on a conical milling cutter tool.

It will be realised that, with an insert in accordance with the present invention, in order to ensure this reduction in the overall forces acting on the insert tending to detach the insert from the holder, it si necessary to provide the insert with component cutting edges which are angularly directed with respect to each other. Where, however, milling considerations are such that this requirement for reduction in the overall so-called detaching forces becomes secondary and it is, on the other hand, desirable to ensure that all the component cutting edges present the same or similar positive axial rake angle, an arrangement such as shown in FIGS. 7, 8 and 9 of the drawings can be adopted. As seen in these figures, a modified insert 31 is formed with sets of components cutting edges 32a, 32b and 32c which, whilst being overlapping in the sense that the cutting edges 17a, 17b and 17c of the cutting insert described with reference to the preceding drawings are overlapping, are nevertheless all parallel to each other and define a single axial rake angle which is highly positive.

As seen in FIG. 9 of the drawings, the component cutting forces $F_a$, $F_b$ and $F_c$ acting respectively on the component cutting edges 32a, 32b and 32c are all equal and, when summed, are substantially greater than the component cutting force F shown in FIG. 6a of the drawings with reference to the insert having component cutting edges as shown in the preceding drawings. Thus, in this case the force tending to detach the insert from the tool holder is significantly greater than the corresponding force acting on the insert in accordance with the preceding drawings. On the other hand, the fact that all constituent component cutting edges present the same significant positive axial rake angle carries with its own advantages, which may be preferred under certain circumstances.

Reference will now be made to FIGS. 10a, 11a, 12a, 10b, 11b and 12b for a description of the construction of the relief flanks, cutting rake surfaces and K-lands in accordance with a preferred embodiment of the invention.

In order to achieve optimal milling conditions, the component relief flank, cutting rake and K-land surfaces are so disposed with respect to each other so that, at corresponding locations along the component cutting edges, the relief flank, cutting rake and K-land angles are equal. Thus, for example, at the mid points of each component cutting edge, these angular conditions are fulfilled, FIGS. 10a, 11a, 12a, 10b, 11b and 12b show sections through the cutting insert along section lines which pass through the respective mid positions of the component cutting edges. In all cases, the component relief flank angles $\gamma_a$, $\gamma_b$ and $\gamma_c$ are measured between the respective component relief flank surface 13a, 13b and 13c and the respective tangents 41a, 41b and 41c to the circular paths 40a, 40b and 40c at the positions where the mid points of the component cutting edges lie on these circular paths. As can be seen, the component relief flank surfaces 13a, 13b and 13c are angularly disposed with respect to each other so that at these respective mid points the component relief flank angles $\gamma_a$, $\gamma_b$ and $\gamma_c$ are all equal.

Similarly, the component cutting rake angles $\beta_a$, $\beta_b$ and $\beta_c$ are measured between the component cutting rake surfaces 16a, 16b and 16c and respective radii 42a, 42b and 42c extending from the centres of the circular paths 40a, 40b and 40c to the positions where the mid points of the component cutting edges lie on these circular paths. Here again, the component cutting surfaces 16a, 16b and 16c are so disposed angularly with respect to each other that the cutting rake angles at the mid points of the component cutting edges $\beta_a$, $\beta_b$ and $\beta_c$ are all substantially equal.

Finally, the K-land angles $\theta_a$, $\theta_b$ and $\theta_c$ of the component K-lands 18a, 18b and 18c as measured at the respective mid points of the component cutting edges, and as defined between the K-land surfaces 18a, 18b and 18c and the radii 42a, 42b and 42c, are all substantially equal.

Whilst in the embodiment specifically described above the relief flank cutting rake and K-land angles associated with the component cutting edges are equal when measured with respect to corresponding points on the respective cutting edges (for example, as described above with respect to the mid points of the cutting edges), in accordance with a further refinement, each component cutting edge, relief flank surface and K-land can be so curved as to ensure that along the entire length of a particular component cutting edge the relief flank, cutting rake and K-land angles remain substantially invariant. The particular modes by which these curvatures are ensured are described in co-pending U.S. patent application Ser. No. 699,975 and U.S. Pat. Nos. 5,052,863; 5,071,292 and 5,078,550.

With milling cutting tools employing inserts in accordance with the invention, i.e. with component cutting edges of limited extent and which effectively overlap vis-a-vis the milling operation, the forces acting on the cutting insert and which tend to induce vibration ("chatter") are considerably reduced and this by virtue of the fact that the chips created during the milling operation are of relatively restricted width and do not combine so as to create the vibration-generating forces on the insert. The milling operation resulting in the generation of such relatively narrow chips is illustrated schematically in FIG. 13 of the drawings. Here an insert 51 is mounted on a conical holder 52 so as to perform a milling operation. As can be seen, the component cutting edges give rise to the production of a chip 53 which effectively consists of three relatively narrow chips 53a, 53b, 53c which spread apart at their free ends, and are only coupled together by very weak, perforated bridges 54 which are completely ineffective in the transference of forces between the component chips 53a, 53b, 53c, and the insert 51.

It will be understood that, in order to ensure that the chips generated during the milling operation are either completely separated into component chips or are generated in the form shown in FIG. 13 of the drawings, where they are held together by very weak bridges, it is necessary to ensure that not only the component cutting edges overlap as described and defined above, but also that the leading end of one cutting edge is spaced from the trailing end of the preceding component cutting edge by a distance which is not less than the thickness of the chip which is to be cut. In other words, that the intermediate edges 19 and 21 between successive component cutting edges slopes towards the base edge 20 of the insert by an amount not less than the maximum thickness of the chip.

Figure 14:
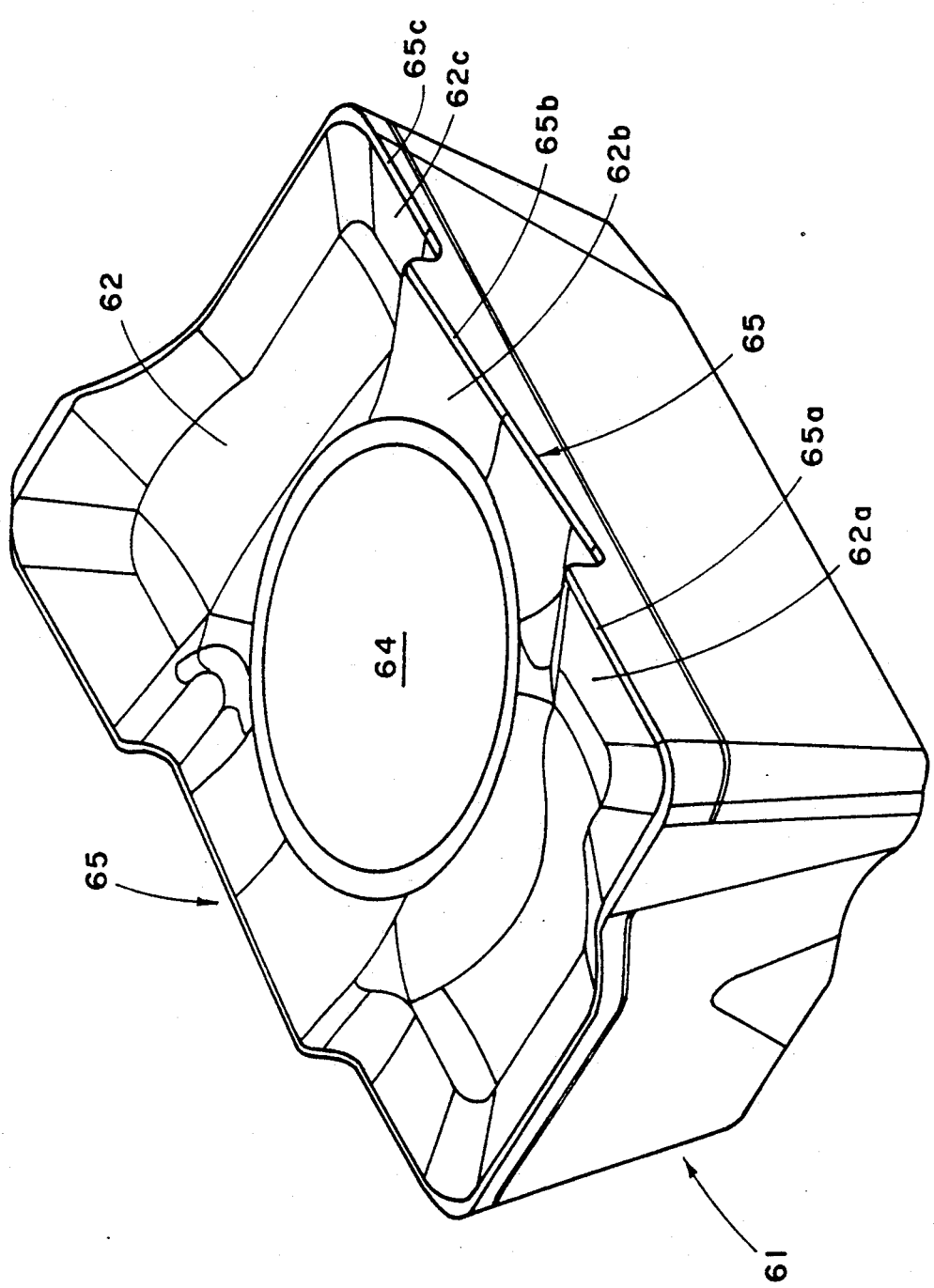
FIG. 14 is a perspective view of a further embodiment of a cutting insert in accordance with the invention.
Figure 15:
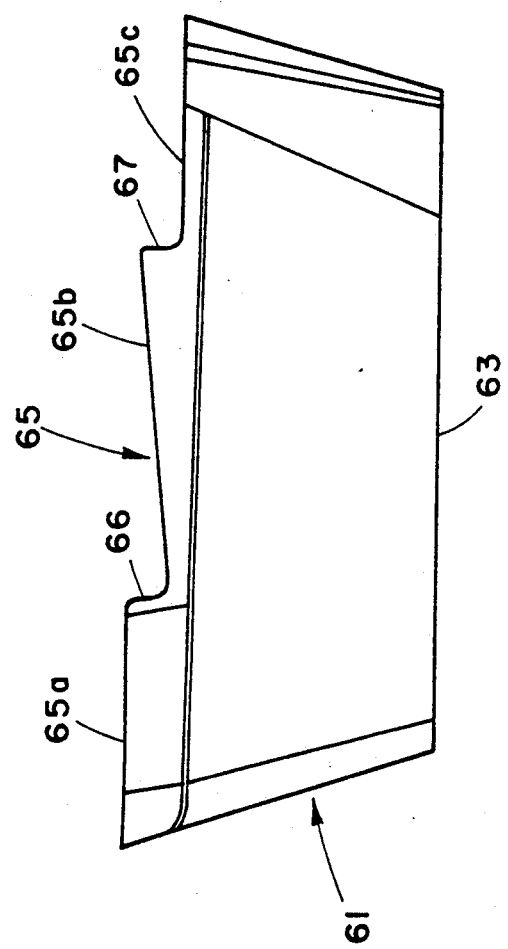
FIG. 15 is a side elevation of the insert shown in FIG. 14.

The particular distribution of the component cutting edges, i.e. the relative lengths and their axial rake angles when the insert is mounted on the tool, has a direct bearing on the strength of the insert. This is particularly the case where the insert is formed with a centrally disposed clamping bore which of necessity introduces a weakened zone into the insert. FIGS. 14 and 15 of the drawings illustrate an embodiment of such an insert.

As seen in these figures, an insert 61 of substantially rectangular parallelepipedal shape is formed, as before with an upper rake surface 62 and a planar base surface 63 and is provided with a central clamping bore 64 of diameter d. The insert 61 is provided with relief flank and cutting rake surfaces as described above with respect to FIG. 1 of the drawings. In the case of the present insert, however, there are defined, between an opposite pair of major relief flanks and their adjacent cutting rake surfaces, a pair of cutting edges 65, each of which comprises three successive component cutting edges 65a, 65b and 65c respectively associated with component cutting rake surfaces.

As before, the leading component cutting edge 65a merges at its terminal extremity with the succeeding component cutting edge 65b via an intermediate cutting edge 66 which slopes downwardly towards the base 63 of the insert 61. Similarly, the component cutting edge 65b merges with the succeeding cutting edge 65c via an intermediate edge 67, which also slopes downwardly towards the base 63 of the insert 61.

The insert just described is mounted as shown in FIG. 5 of the drawings in a rotary milling cutter 25 having a cylindrical holder 26, the insert being mounted so that its base presents a positive axial rake angle α with respect to an axis of rotation 27 of the cutter tool 25.

As was described with reference to FIG. 5 of the drawings, also in connection with the insert shown in FIGS. 14 and 15 the component cutting edges 65a and 65b effectively overlap during a milling operation, as do the cutting edges 65b and 65c.

As can be seen, the leading and trailing component cutting edges 65a and 65c, being substantially parallel to the base 63 of the insert 61 present, when mounted in the tool, a relatively high positive axial rake angle and this, as is well known, is advantageous for those regions where the insert enters and leaves the workpiece. On the other hand, the intermediate component cutting edge 65b presents, when mounted on the tool, a significantly lesser (even negative) axial rake angle.

As can be seen, the intermediate component cutting edge 65b is of significantly greater length than each of the adjacent component cutting edges 65a and 65c (preferably the length of the component cutting edge 65b is equal to the sum of the lengths of the component cutting edges 65a and 65c). Furthermore, the intermediate component cutting edge 65b is substantially coextensive with the bore 64 and its length is therefore preferably at least equal to d. It therefore follows that the central region of the insert, which includes the bore 64 and is therefore potentially the weakest region of the insert 61, is protected against undue fracturing stresses by having its associated cutting edges 65c of reduced axial rake angle positivity or even of negative axial rake angle.

It will be appreciated that the leading and trailing component cutting edges 65a and 65c do not necessarily have to be parallel to each other or to the base of the insert. All that is required is that the intermediate cutting edge 65b be of a significantly lesser degree of axial rake angle positivity than that of the leading and trailing component cutting edges 65a and 65c. Similarly, the length of the intermediate cutting edge 65b need not necessarily be equal to the combined lengths of the component cutting edges 65a and 65c. All that is required is that the length of the component cutting edge 65 (which is substantially coextensive with the bore 64) is substantially greater than the lengths of each of the component cutting edges 65a and 65c.

Whilst the invention has been specifically described with reference to the milling cutting inserts of parallelepipedal shape, i.e. having four sides and associated cutting edges, it will be readily appreciated that the invention is equally applicable to cutting inserts of other shapes such as, for example, triangular shapes. Similarly, inserts can be employed such as, for example, inserts of oblong rectangular shape wherein the component cutting edges are formed on one pair of opposite sides of the insert. Furthermore, whilst the invention has been specifically described with reference to inserts having at each side three component cutting edges, it will be appreciated that the invention is equally applicable to inserts wherein two or more component cutting edges are provided.

It will furthermore be noted from FIGS. 9 and 13 of the drawings that the inserts are mounted in a conical tool holder as compared with the cylindrical holder in FIG. 4 of the drawings. It will be appreciated, however, that the use of inserts in accordance with the invention is not restricted to any particular form of tool holder.

We claim:

1. In a cutting insert of substantially parallelepipedal shape for use with a rotary milling cutter tool and having an upper rake surface and a base surface with a centrally disposed clamping bore and having a pair of substantially parallel major cutting edges and a pair of substantially parallel minor cutting edges directed transversely with respect to the major cutting edges, each major cutting edge being defined between an adjacent rake surface and a relief flank, each relief flank defining with said base surface a base edge;

the improvement wherein each major cutting edge comprises first, second and third successive component cutting edges, each second component cutting edge being substantially coextensive with said bore and being of substantially greater length than the length of each of said first and second component cutting edges and defining with respect to an axis of rotation of the cutter tool an axial rake angle which is substantially less positive than the axial rake angles defined respectively by said first and third component cutting edges with respect to said axis of rotation, and wherein each component cutting edge has respective leading and trailing extremities, the trailing extremity of one component cutting edge merging with the leading extremity of a succeeding component cutting edge via an intermediate edge, said intermediate edge being directed from said trailing extremity of said one component cutting edge towards said base edge; each normal to said axis of rotation of the cutter tool which passes through a trailing extremity of one component edge intersecting the successive component cutting edge so that, during a milling operation, successive component cutting edges overlap.

2. A cutting insert according to claim 1, wherein the component cutting edges are respectively associated with component relief flanks, which are so directed towards each other than the insert side relief angles at corresponding locations on successive component relief flanks and as defined with respect to the milling cutter tool, are substantially equal.

3. A cutting insert according to claim 2, wherein said relief flank surface comprises an upper portion which comprises said component relief flank surfaces and a substantially planar lower portion.

4. A cutting insert according to claim 1, wherein the component cutting edges are respectively associated with component cutting rake surfaces which are so directed towards each other that insert cutting rake angles at corresponding locations on successive component cutting rake surfaces, and as defined with respect to the milling cutter tool, are substantially equal.

5. A cutting insert according to claim 2, wherein each component relief flank and cutting rake surface are continuously curved so that the insert, rake and relief angles as defined with respect to the cutter tool remain substantially invariant along the length of the component cutting edge.

* * * * *